United States Patent [19]
Takada, deceased

[11] 3,913,977
[45] Oct. 21, 1975

[54] AUTOMATIC LOCKING BELT SUPPORTED RETRACTOR

[75] Inventor: Takezo Takada, deceased, late of Tokyo, Japan, by Juichiro Takada, heir

[73] Assignee: Takata Kojyo Co., Ltd., Tokyo, Japan

[22] Filed: Feb. 14, 1974

[21] Appl. No.: 442,974

[30] Foreign Application Priority Data
Feb. 16, 1973 Japan.............................. 48-18300
Mar. 6, 1973 Japan.............................. 48-25702

[52] U.S. Cl............... 297/388; 24/196; 280/150 SB
[51] Int. Cl.².................. B60R 21/10; A47D 15/00
[58] Field of Search.................. 297/386, 388, 389; 242/107.2; 24/196; 280/150 SB

[56] References Cited
UNITED STATES PATENTS
| | | | |
|---|---|---|---|
| 3,249,386 | 5/1966 | Board et al. | 297/388 |
| 3,313,572 | 4/1967 | Smith | 297/388 |
| 3,375,994 | 4/1968 | Wohlert et al. | 242/107.2 |

Primary Examiner—Casmir A. Nunberg
Attorney, Agent, or Firm—Wolder & Gross

[57] ABSTRACT

A vehicle safety belt has one end anchored to the vehicle and has a belt retractor device at its free end provided with a buckle coupling member. The retractor device includes an open bottom shell supporting at its rear end a spring biased belt retractor reel, and at its front end a longitudinally fixed transverse rough surfaced guide bar. A buckle engaging tongue is swingably and longitudinally, movably, supported by the shell relative to the guide bar and includes at its rear a transverse guide slot whose rear is defined by a transverse lock bar. The belt extends from the reel upwardly through the guide slot, around the upper part of the guide bar and downwardly through the guide slot and rearwardly. When the tongue and shell members are longitudinally aligned, the belt is locked between the bars and it is released by the swinging of the tongue downwardly relative to the shell to separate the bars. In one form the tongue is connected to the cover member by slots formed in upright side walls engaging the non circular ends of the guide bar, which is pivotally connected to the cover member. Another feature is the provision of axially spaced sleeves between the reel support axle and the helical spring which biases the reel.

11 Claims, 10 Drawing Figures

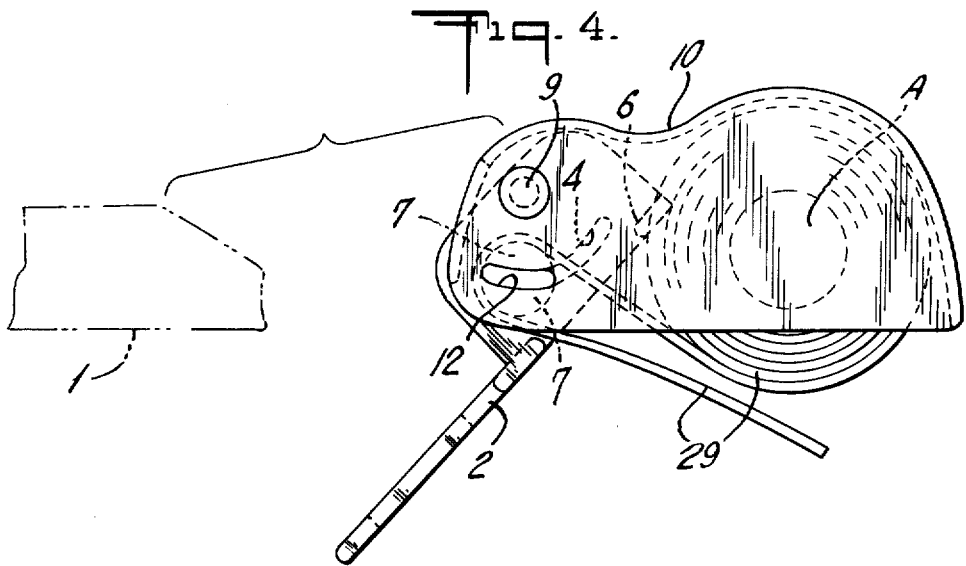
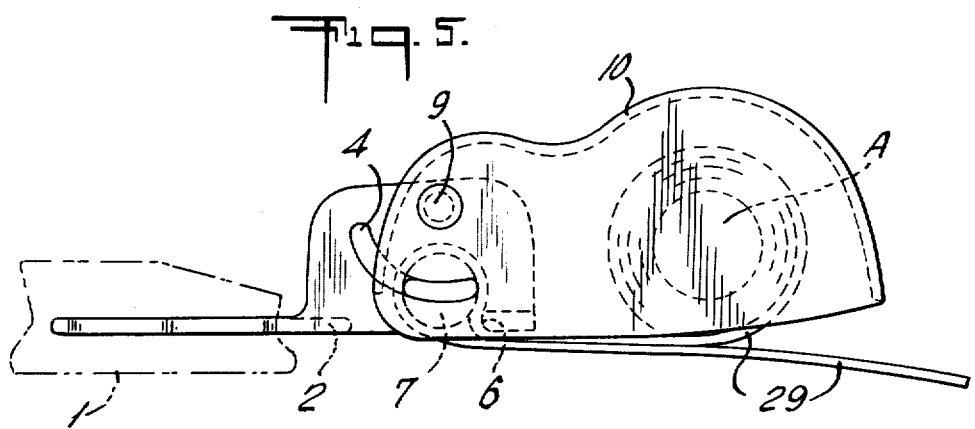

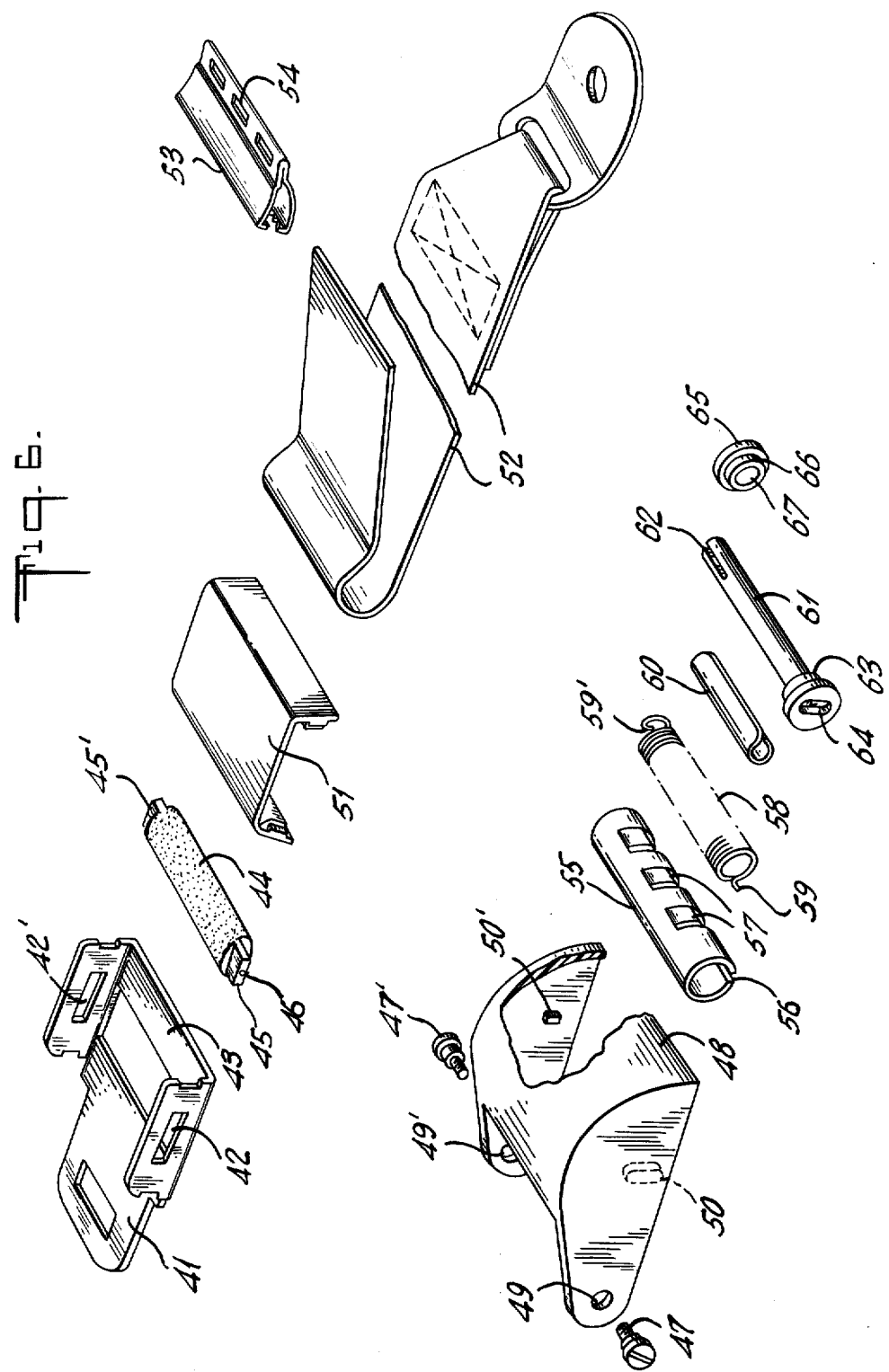

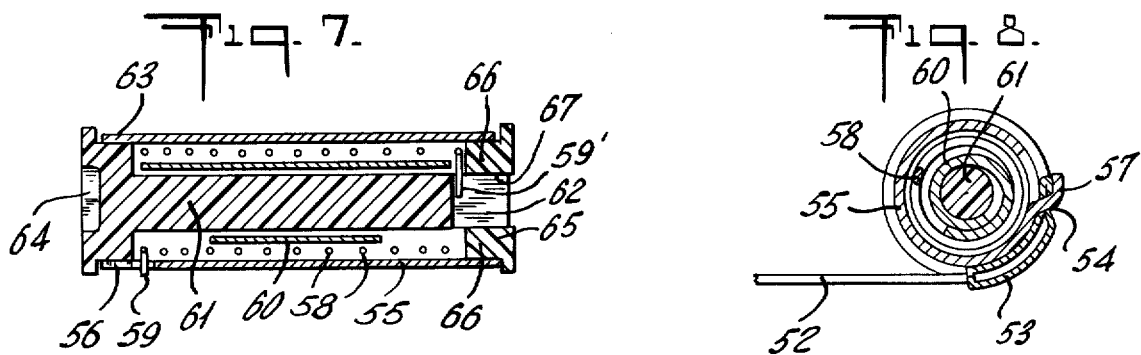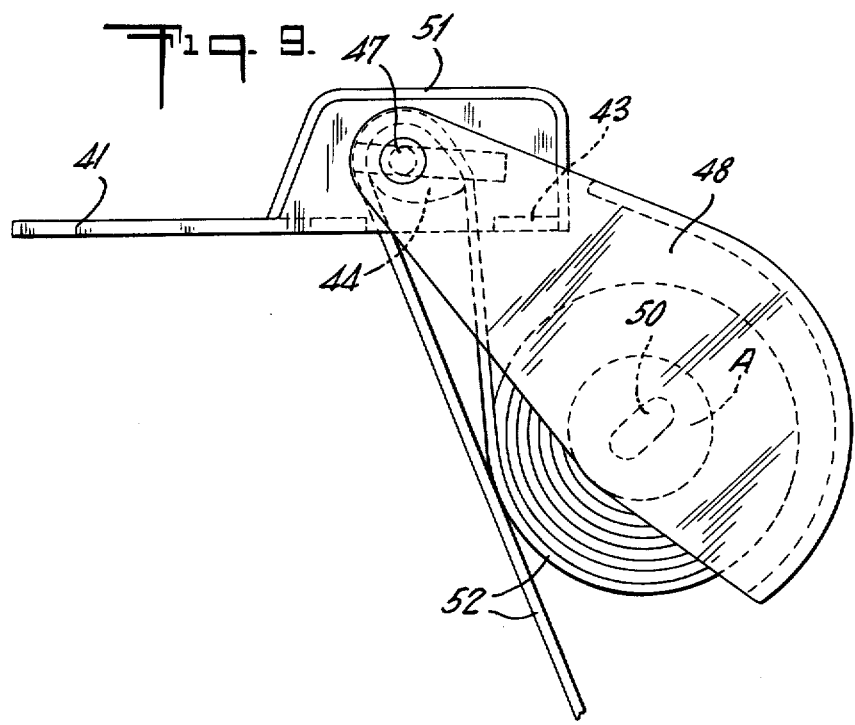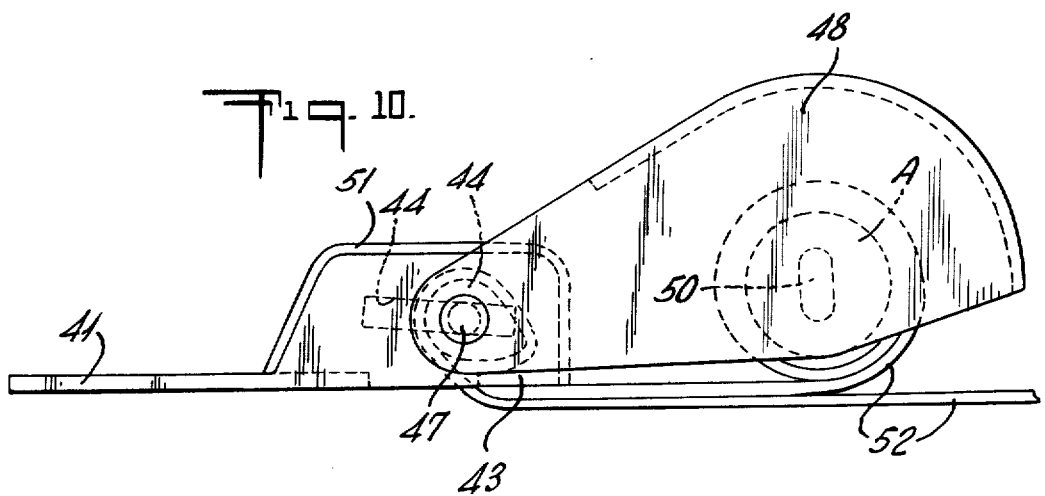

AUTOMATIC LOCKING BELT SUPPORTED RETRACTOR

BACKGROUND OF THE INVENTION

The present invention relates generally to improvements in retractable vehicle safety belt systems, and it relates more particularly to an improved safety belt retractor reel which is mounted at the free coupling end of a belt whose opposite end is anchored to the vehicle.

The conventional safety belt retractor reel, particularly those provided with belt locking mechanisms, are of the type which are anchored to the vehicle and are generally bulky devices, which occupy considerable space and are thus difficult to properly locate and mount and are highly inconvenient. Safety belt retractor reels of the automatic belt locking type which are mounted at the free end of the safety belt and are provided with a buckle coupling element have been heretofore proposed, and while these possess important advantages, they also have many drawbacks which offset such advantages. They are generally complex and unreliable devices which are bulky, inconvenient and expensive, are of little versatility and otherwise leave much to be desired.

SUMMARY OF THE INVENTION

It is a principal object of the present invention to provide an improved vehicle safety belt retractor.

Another object of the present invention is to provide an improved safety belt retractor reel which is carried by the free end of the belt.

Still another object of the present invention is to provide an improved retractor reel of the type which is carried by the free end of the belt and automatically locks the belt when it is applied to a vehicle seat occupant and buckled.

A further object of the present invention is to provide an improved spring biasing mechanism for a belt reel.

Still a further object of the present invention is to provide an improved device of the above nature characterized by its ruggedness, reliability, compactness, ease and convenience of operation and great versatility and adaptability.

The above and other objects of the present invention will become apparent from a reading of the following description taken in conjunction with the accompanying drawings which illustrate preferred embodiments thereof.

In a sense, the present invention contemplates the provision of a belt retractor reel comprising a bracket, advantageously a cover defining shell member which supports at its rear a spring biased belt retractor reel and at its front a longitudinally fixed roughened guide bar, a forwardly projecting coupling member swingably and longitudinally movably mounted on the bracket forward portion and including a rear cross web having a transverse guide slot whose rear is delineated by a lock bar which is movable toward and away from the guide bar with the swinging of the coupling member to and away from alignment with the bracket, respectively, and a safety belt connected to and windable about the reel and extending therefrom upwardly through the guide slot forwardly about the top of the guide bar, downwardly through the guide slot and then rearwardly. The coupling member advantageously includes upwardly directed side walls at its rear which have longitudinal slots therein. In one form the coupling member is pivoted to the bracket by pivots through the side walls above the slots which are arcuate, the slots slideably engaging the flatted sides of the guide rod which engage mating openings in the bracket side walls. In another form the guide bar is rockably supported by the bracket and the slots in the side walls of the coupling member are linear and slideably engaging flatted end portions of the guide bar.

Another feature of the present invention resides in the construction of the retractor reel, per se, which includes a stationary axle which carries a plurality of independently rotatable end to end sleeves. A helical biasing spring surrounds the sleeves and a spool sleeve in turn surrounds the spring, one end of the spring being connected to the axle and the other end being connected to the spool sleeve.

The improved device is simple, compact, rugged, highly reliable, easy to assemble and install, of low cost, convenient to use and of great versatility and adaptability.

BRIEF DESCRIPTION OF THE DRAWING

FIG. 4 is a view similar to FIG. 2 illustrating the device in a belt wound unlocked condition;

FIG. 5 is a view similar to FIG. 4 illustrating the device with the belt in a partially withdrawn locked condition;

FIG. 6 is an exploded perspective view of another embodiment of the present invention;

FIG. 7 is a longitudinal sectional view of the assembled reel portion;

FIG. 8 is a transverse sectional view thereof with the belt connected thereto;

FIG. 9 is a side view of the device in a belt retracted belt unlocked position; and FIG. 10 is a view similar to FIG. 9 with the device shown in a belt withdrawn belt locked condition.

DESCRIPTION OF THE PREFERRED EMBODIMENTS

Figure 1:
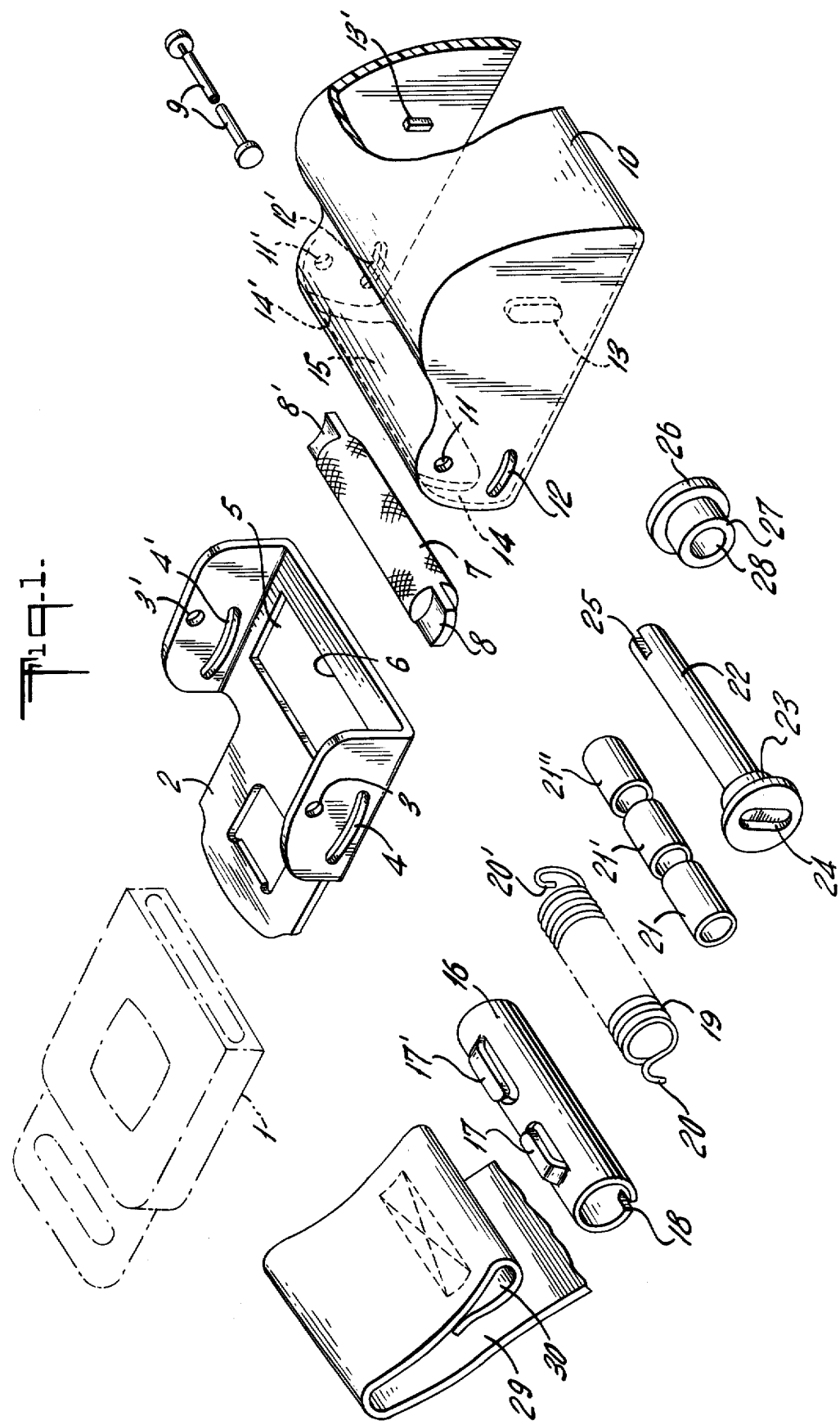
FIG. 1 is an exploded perspective view of a preferred embodiment of the present invention.

Referring now to the drawings, particularly FIGS. 1 to 5 which illustrate a preferred embodiment of the present invention, the reference numeral 1 generally designates a buckle which defines a first coupling member which releasably, lockably engages a mating second coupling or tongue member 2. The trailing portion of tongue member 2 is formed with a U-shaped bracket having opposite side walls in which are formed transversely aligned fulcrum holes 3, 3' and arcuate slots 4, 4' concentric with holes 3, 3' and extending rearwardly and downwardly from the leading sections of the bracket side walls. Also formed in tongue 2 between the bracket side walls is a transversely extending belt passage slot 5, the rear edge portion thereof functioning as a brake bar or abutment 6.

There is provided a metal belt guide rod 7 having a roughened surface formed by milling, sandblasting or otherwise, the ends of rod 7 being flatted to rectangular or slightly arcuate end sections 8, 8' which slideably engage the slots 4, 4' so that the rod 7 is movable to a position substantially at the level of tongue member 2. A transverse metal hinge pin is journalled in the holes 3, 3'.

A molded resin shell shaped winding frame has flat parallel side walls and a double peaked longitudinally undulate top wall, the front upper corners of side walls having transversely aligned apertures 11, 11'.

The winding frame 10 is positioned atop and sandwiches the two side walls of the tongue member 2, and the pin 9 is passed through the holes 11, 11' and fulcrum holes 3, 3' and secured by heading or the like. Milled holes 12, 12' of the same size and shape as that of the end sections 8, 8' of the rod 7 are formed below the pin holes 11, 11'. The end sections 8, 8' while projecting from the side walls of the tongue member 2, under momentary outward expansion of the winding frame 10 at the time of insertion of the pin 9, are inserted into the milled holes 12, 12'. When the tongue member 2 and the winding frame 10 swing about the pin 9, the rod 7 slides along the elongated slots 4, 4' of the tongue member 2. On the inner surfaces of the two side walls of the frame 10 and about centrally of the rear peak thereof, there are formed inwardly directed projections 13, 13' for retaining a winding spool A as will be hereinafter described. The winding spool A is retained by the prjections 13, 13' under momentary expansion of the both sides of the frame 10. The winding frame 10 also functions as a reel cover and has side slits 14, 14' in its front face which delineate a belt cover 15 for the U-shaped section of the tongue member 2. The operation of the present device is not impeded when the front of the winding frame 10 is extended so as to wholly cover the U-shaped section of the tongue member 2.

The winding spool A comprises a molded belt-retaining outer cylinder 16 made of metal or a resin material and has opposing tongues 17, 17' for engaging the safety belt and a spring retainer slot 18 at an end edge, a helical spring 19 wound of round, square or flat resilient piano wire and having one end bent outwardly into a hook 20 and the other end bent inwardly into a hook 20', several end-to-end coaxial slide tubes 21 to 21'' made from thin metal sheet or molded from a resin material, a molded resin shaft 22 having an engaging section 23 for the outer cylinder and an oblong recess 24 in its outer end face and a slit 25 on its other end face, and a molded resin flanged bushing piece 26 having an engaging section 27 for the outer cylinder 16 and a hole 28 for press-fit on the shaft 22.

Figure 2:
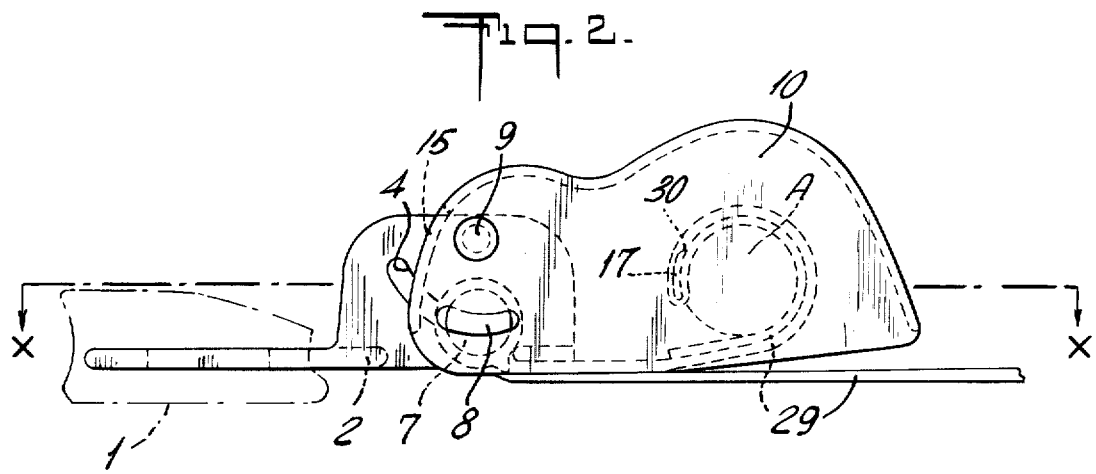
FIG. 2 is a side elevational view thereof.
Figure 3:
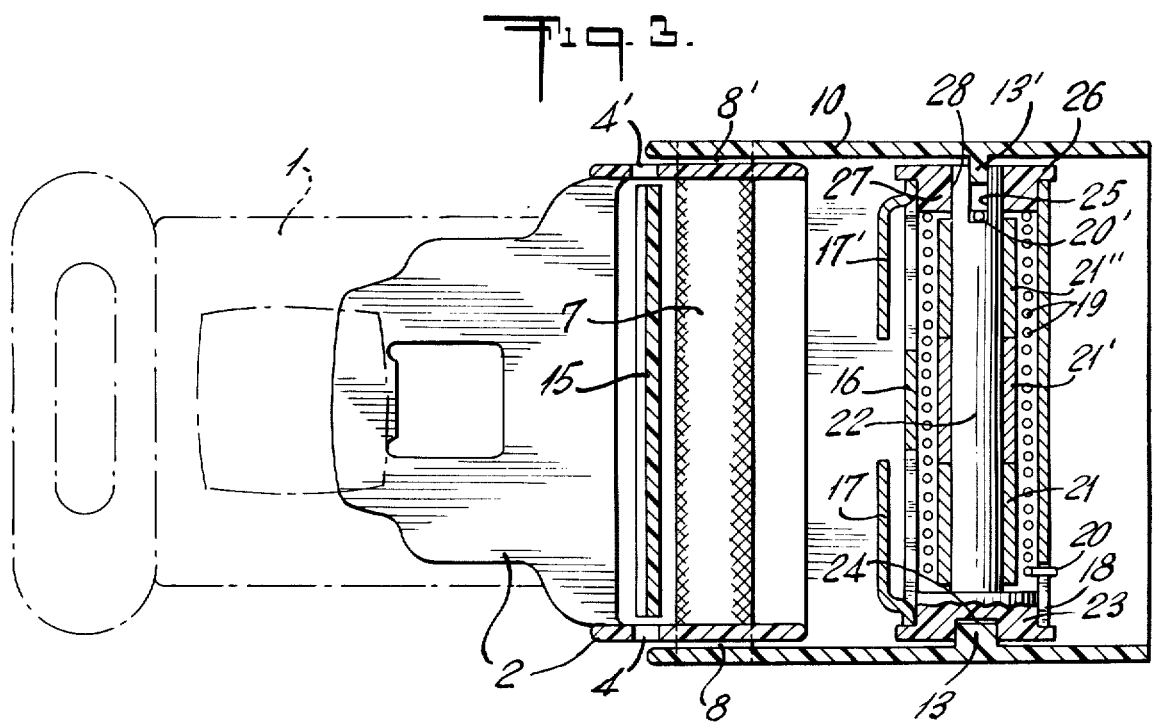
FIG. 3 is a sectional view taken along line 3—3 in FIG. 2.

In assembling the above parts into the reel or winding spool A, the slide tubes 21 to 21'' are slideably applied to the shaft 22, and the spring 19 is then applied with the hook 20' brought into engagement with slit 25 of the shaft 22. Next, the outer cylinder 16 is applied with the spring retainer slot 18 engaging the hook 20 of the spring 19 and is simultaneously brought into engagement with the section 23 of the shaft 23. The piece 26 is press-fit to the end of shaft 22, while the engaging section 27 of the piece 26 registers the outer cylinder 16. The end of the safety belt 29 associated with the tongue is secured at one end to the vehicle floor with metal fitting of a small size, while the other end of the belt is folded on itself and seamed together into a loop 30. This loop section 30 is passed through the lower front side of the belt opening 5 in the tongue member 2 and wound once about the upper face of the rod 7 and then passed downwardly through opening 5. The winding spool A disposed in the winding frame 10 is turned clockwise by a predetermined number of times, as for example 15 times, as indicated in FIG. 2, for accumulating sufficient winding energy in the winding spool A. The loop 30 of the belt 29 is then engaged with the tongues 17, 17' of the winding spool A. Thus, when the tongue member 2 and the winding frame 10 effects a slight relative swinging movement, the rod 7 is advanced by the openings 12, 12' of the winding frame 10 and disengaged from the abutment 6 of the tongue member 2. The pressure so far exerted on the belt 29 interposed therebetween is now released and the belt 29 is wound on the spool A to take up any slack.

In the operation of the winding cylinder or reel A, the shaft 22 is secured in a fixed position inside the frame 10 by virtue of the recess 24 and the slit 25 and projections 13, 13'. The spring 19 is interposed between the slide tubes 21 – 21' and the outer cylinder 16, for winding the belt 29 under the recoiling force of the spring 19. For accumulating this winding force, it is necessary to wind the spring 19 a number of turns, as for example 15 turns. Usually, the diameter of the spring 19 is reduced excessively, starting from its one side. Thus, the core is clamped, and the winding force cannot be developed for the whole spring length in the absence of sleeves 21 – 21''. According to this apparatus, the slide tubes 21, 21', 21'' are slid longitudinally and sequentially through the space defined by the spring 19 and the shaft 22.

The return force of the spring 19, the belt winding force, thus has full play for its whole coil length, thus assuring a uniformly good performance.

FIG. 4 shows the state in which the buckle 1 and the tongue member 2 are not coupled together and when the passenger takes his seat he lifts the frame 10 manually. The belt 29 then pulls in a direction away from the rod 7 under the winding force of the cylinder A and the tongue member 2 swings downwards with pin 9 as center. The rod 7 held by the holes 12, 12' of the winding frame 10 is moved forwards along the holes 4, 4' in a direction away from the abutment 6. The belt 29 is now unlocked and wound on the spool to take up its slack. When next the winding frame 10 is held manually and coupled to the buckle proper 1, with the tongue member being pivoted downwards, the belt 29 is reeled out a required length in tight contact with the body of the passenger as shown in FIG. 5. The belt 29 is now taut and exerts a lifting force on the bottom of the cylinder A or to the bottom of the wound belt 29, thus bringing the winding frame 10 into substantial alignment with the tongue 2. The rod 7 accordingly urges the belt 29 to the abutment 6 of the tongue member 2 to prevent any reeling out of the belt 2.

When fitting the tongue member 2 to the buckle proper, the upper limit of the swinging movement of the frame 10 is determined by the rod 6 and the abutment 6 and the lower limit is also determined by the length of the slots 4, 4'. The swinging is thus limited to a small angle, thereby facilitating the insertion of the tongue member into the buckle 1.

In FIGS. 6 to 10 of the drawings there is illustrated another embodiment of the invention. A tongue member 41 of known type is made of a metal plate and can be inserted in a buckle body and releasably locked therein. The rear part of tongue member 1 is a U-shaped frame and on both sides are provided rectangular slots or long holes 42, 42' which are rearwardly, downwardly inclined and transversely aligned. The U- shaped frame is provided in its cross-web with a transverse rectangular belt hole and the rear upper bordering surface thereof defines a lock surface 43. A metal lock or guide bar 44 has a coarse surface coarsened by sand blasting, knurling or the like, and the central part is of a curved fan or round shape and its both ends terminate in flattened slide portions 45, 45'. The rectangular slide portions 45, 45' slideably engage the long holes 42, 42' of the tongue member 41, and a safety belt 52 is releasably locked between lock bar 44 and the lock surface 43 of tongue piece 41 at the rear of long holes 42, 42'. The full length of the lock bar 44 extends to both outer sides of the U-shaped frame of the tongue member 41, and the end face of the slide portions 5 are formed tapped screw holes 46, for holding stepped pins 47, 47'.

The stepped pins 47, 47' rotatably connect a wider or reel cover 48 to the lock bar 44.

The winder cover 48 is molded of a polymeric resin and has nearly flat side walls as well as an arched covering part or wall on the upper and rear side wall edges, both side walls protruding forwardly and having transversely aligned holes 49, 49'. Stepped pins 47, 47' engage the screw holes 46 of the lock bar end pieces 6, 6' which are inserted in long holes 42, 42' and also engage the pin holes 49, 49' and permit the swinging of the winder cover 48. Also near the central part of both cover side walls are provided inwardly directed transversely aligned projections 50, 50' for holding the take-up reel or winding-in cylinder A.

A belt cover 51 is molded of a polymeric resin and its shape and inherent resilience allow it to cover the U-shaped portion of the tongue piece 1 simply by being snapped onto the side walls thereof. The safety belt 52 has an end connected to the tongue member side and its other end fastened to the vehicle floor by means of a compact mounting fitting, the tongue member end of the belt 52 extends upwardly through the belt hole and loops about the upper face of the lock or guide bar 54.

A belt connector 53 is of V-shape and formed of thin metal plate and the arms thereof terminate in inwardly, outwardly inclined teeth which bite into the belt 52. The converged portions of connector 53 overlap and are provided with several coupling holes 54 engaging the winding-in cylinder A. The divergent arms of the connector 53 are shaped round to fit the outer periphery of the winding-in cylinder A. The connector 53 is clamped to one end of the belt 52 protruding downward beyond the tongue member.

The winding-in cylinder A consists of an outer cylinder 55, helical spring 58, winder plate 60, shaft 61 and bushing 65. The outer cylinder 55 is of a tubular form and molded of a resin and has a slit 56 at one end to engage a spring, and one side of cylinder 55 is provided with several hooks 57 to engage the connector 53 or holes in the belt 52 as will be hereinafter explained. The hooks 57 are resilient and do not allow the inadvertent release of the engaged connector 53. The strength and configuration of the hooks 57 may be such as to support only the winding force of the spring 58, and not disturb the circular winding of the belt 52. The spring 58 consists of a round, square, or leaf-like resilient piano wire helically wound in a cylindrical form, with its one end being bent outward to form a bent portion 59 and the other end being bent inward to form a bent portion 59'.

The winder plate 60 consists of a nearly circular metal plate folded cylindrically to rotatably engage a shaft 61; both ends of the plate 60 are sharp to minimize the contacting areas of the spring 58 when the spring 58 is engaged and twisted, and in order to allow easy twisting as the winder plate moves toward both ends from the smaller diametered portion caused by twisting. The shaft 61 is molded of a resin with its one end having a slit 62 and the other end having a stepped disc with a stepped part 63 which slides along the inner surface of the outer cylinder 65. In the outside end of the stepped part 63 is formed an oblong recess 64, and the slit 62 and the recess 64 non-rotatably engage the projections 50', 50 of the winder cover 48. The bushing 65 is stepped, and the stepped part 66 slides along the inner surface of the outer cylinder 55. An axial bore 67 is formed in bushing 65 and engages the shaft 61.

The assembly of the winding-in cylinder A is effected by sequentially applying the winder plate 60, spring 58, and outer cylinder 55 onto the shaft 61, engaging the bent portion 59 of the spring 58 with the slit 66 of the outer cylinder 55, and hooking the bent portion 59' to the slit 62 of the shaft 61, and press-fit the bushing 65 into the shaft 61. The so assembled winding-in cylinder A is assembled with recess 64 and slit 62 engaging the projections 50, 50' of the winder cover 48. After having twisted the outer cylinder 55 of the winding-in cylinder A many turns in the direction opposite to the winding direction of the belt 52, the holes 54 of the connector 53 are engaged with the hooks 57 of the outer cylinder 55. In this case, the belt 52 may be directly connected to the hooks 57 of the outer cylinder 55 by providing the belt with holes similar to the holes 54 of the connector 53, thus obviating the connector 53.

Considering the operation of the last described embodiment as shown in FIG. 9, where the tongue is separated from the buckle body, the tongue 41 is slid forward in such a manner as to swing the tongue 41 relative to the winder cover 48, so that the guide bar 44 is separated from the lock surface 43 of the tongue. The belt 52 slides over the surface of the lock bar 44, and the loosened part of the belt 52 is wound onto the winding-in cylinder A due to the restoring force of the spring 58 of the take-up reel A. The belt 52 connected to the winding-in cylinder A starts to be wound starting with one end of the belt, so that the wound belt 52 assumes a circular form allowing for a smooth winding operation, and furthermore, an increased amount of belt with the winder cover of the same size.

Next, the winder cover 48 and tongue member 41 are advanced until the required length of the belt 52 has been withdrawn and the winder cover 48 is pulled a little backward so that the tongue 41 and the winder cover 48 are in alignment, the action of long holes 42, 42' of which the front end is high and rear end is low, causes the lock bar 44 to fasten the belt 52 to the lock surface 43, and the belt 52 is thereby locked. If strong load is applied to the safety belt due to collision, etc. and the guide or lock bar 44 owing to the tension of the belt 52 and the inclination of the long holes 42, 42', fastens the belt more tightly to the lock surface 43 and the belt 52 is more tightly locked as shown in FIG. 10. To release the locked belt, the tongue is separated from the buckle body and then the winder cover 48 is pushed with a small force forward with respect to the tongue 41 and the lock bar 44 is separated from the lock surface, and the belt is retracted on the winding-in cylinder A.

While there have been described and illustrated preferred embodiments of the present invention, it is apparent that numerous alterations, omissions and additions may be made without departing from the spirit thereof.

I claim:

1. A retractable safety belt device comprising a bracket, a transversely extending reel mounted at a rear portion of said bracket and spring biased in a belt retracting direction, a transversely extending guide bar mounted at a forward portion of said bracket and fixed against longitudinal movement therein, a forwardly projecting coupling member mounted on the forward portion of said bracket and movable relative thereto between advanced and retracted positions, said coupling member including a cross web at its rear portion having a transverse guide slot therein whose rear edge is defined by a transverse lock bar parallel to said guide bar and movable toward and away from said guide bar with the advance and retraction of said coupling member respectively and a belt connected to and windable by said reel and extending forwardly therefrom upwardly through said guide slot and between said bars, about said guide bar and downwardly through said guide slot and rearwardly toward a vehicle anchor point.

2. The device of claim 1 wherein said coupling member is swingable relative to said bracket between a position in longitudinally alignment with said bracket defining said advanced position and a position rearwardly inclined to said bracket and defining said retracted position.

3. The device of claim 2 wherein said guide bar has a roughened outer face.

4. The device of claim 3 wherein said guide bar is fixed against rotation in said bracket.

5. The device of claim 2 wherein said coupling member is longitudinally movable relative to said bracket member.

6. The device of claim 3 wherein said guide bar is supported for rocking about its transverse axis and is provided at opposite ends with axial projections of non-circular cross section and said coupling includes a pair of parallel side walls projecting upwardly from the rear side edges of said coupling member and having transversely aligned longitudinal slots formed therein and slideably engaging said guide bar projections whereby said guide bar is rotatably fixed relative to said coupling member.

7. The device of claim 1 wherein said coupling member includes a forwardly projecting tongue releasably engagable by a mating buckle.

8. The device of claim 1 wherein said bracket comprises a cover shell including parallel side walls supporting said reel and guide bar and a top wall overlapping the reel wound belt.

9. A safety belt reel comprising a buckle engageable tongue member with a U-shaped portion having, in its upright sides, aligned fulcrum holes and elongated arcuate slots around said fulcrum holes and, in its bottom, a belt hole whose one edge is used as an abutment, a winding frame having a top cover provided with double peaks and two upright sides provided with aligned first holes aligned second holes and projections for retaining a winding spool a roughened rod having opposite non-circular end parts and having the same length as the width of the winding frame, an elongated pin coupling the fulcrum holes of the tongue member and said first holes of the winding frame, and said winding spool consisting of a belt-retaining outer cylinder, a shaft a plurality of slide tubes, a helical spring and a journal bushing piece, said tongue member and said winding frame being relatively swingable through a certain angular extent and the tongue member being thereafter aligned with the winding frame when the belt is reeled out from the tongue member side and the tongue member is coupled to the buckle proper, whereby the rod fitted to the winding frame thrusts said belt to the abutment for locking the belt.

10. A safety belt reel comprising a U-shaped tongue piece having long holes on both side plates and a lock surface at the bottom, a winder cover having transversely aligned holes in both walls and equipped with projections holding a winding-in cylinder, a lock bar with a coarse surface having sliding portions on both ends and provided with screw holes on both ends, stepped pins rotatably attaching a winder cover to the lock bar by means of a pair of holes, a belt cover covering the U-shaped portion of the tongue piece, a connector secured to one end of a belt and fastening the belt to the winding-in cylinder, the winding-in cylinder composed of an outer cylinder equipped with a hooking element engaging the connector, a spring, a winder plate, a shaft and a bushing, wherein the winder cover is attached to both ends of the lock bar fitted to the tongue piece, and the movement of the winder cover with respect to the tongue piece causes the lock bar to lock to the belt or release the locking and fastening of the connector attached to one end of the belt to the winding-in cylinder permitting the belt to be wound nearly in a circular form.

11. A retractable safety belt device comprising a bracket, a transversely extending reel mounted at a rear portion of said bracket and spring biased in a belt retracting direction, a transversely extending guide bar having a roughened surface and mounted at a forward portion of said bracket and fixed against rotation and longitudinal movement therein, a forwardly projecting coupling member swingably mounted to the forward portion of said bracket and swingable relative thereto between an advanced position in longitudinal alignment with said bracket and a retracted position rearwardly inclined to said bracket, said coupling member including a cross web at its rear portion having a transverse guide slot therein whose rear edge is defined by a transverse lock bar parallel to said guide bar and moveable toward and away from said guide bar with the advance and retraction of said coupling member respectively and a belt connected to and windable by said reel and extending forwardly therefrom upwardly through said guide slot and between said bars, about said guide bar and downwardly through said guide slot and rearwardly toward a vehicle anchor point, said coupling member including a pair of parallel side walls projecting upwardly from the rear side edges thereof and being pivoted to said bracket for swinging about a transverse axis above said guide bar.

* * * * *